(12) United States Patent
Kano et al.

(10) Patent No.: US 12,743,012 B2
(45) Date of Patent: Sep. 22, 2026

(54) WAVELENGTH CONVERTER, LIGHT SOURCE DEVICE, AND PROJECTOR

(71) Applicant: SEIKO EPSON CORPORATION, Tokyo (JP)

(72) Inventors: Kengo Kano, Matsumoto (JP); Koya Shiratori, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 347 days.

(21) Appl. No.: 18/512,230

(22) Filed: Nov. 17, 2023

(65) Prior Publication Data

US 2024/0168366 A1 May 23, 2024

(30) Foreign Application Priority Data

Nov. 18, 2022 (JP) ................................ 2022-184669

(51) Int. Cl.
*G03B 21/20* (2006.01)
*C09K 11/77* (2006.01)

(52) U.S. Cl.
CPC ....... *G03B 21/204* (2013.01); *G03B 21/2066* (2013.01); *C09K 11/7774* (2013.01); *G03B 21/208* (2013.01)

(58) Field of Classification Search
CPC ............. G03B 21/204; G03B 21/2066; G03B 21/208; G03B 21/206; C09K 11/7774
USPC ........................................................... 353/31
See application file for complete search history.

(56) References Cited

U.S. PATENT DOCUMENTS

| | | | | |
|---|---|---|---|---|
| 2018/0059522 | A1 | 3/2018 | Huang et al. | |
| 2018/0231880 | A1* | 8/2018 | Masuda | H04N 9/3158 |
| 2019/0041733 | A1* | 2/2019 | Takagi | C03C 27/00 |
| 2021/0165311 | A1* | 6/2021 | Yokoo | G03B 21/204 |
| 2021/0223672 | A1* | 7/2021 | Yokoo | G03B 21/16 |
| 2022/0308431 | A1* | 9/2022 | Kito | G03B 21/204 |

FOREIGN PATENT DOCUMENTS

JP 2018-512617 A 5/2018

* cited by examiner

*Primary Examiner* — Magda Cruz
(74) *Attorney, Agent, or Firm* — Oliff PLC

(57) ABSTRACT

A wavelength converter includes a wavelength conversion layer including a first recess on a first surface thereof and configured to convert blue excitation light into yellow fluorescent light, a first matching layer provided on the light incident surface of the wavelength conversion layer, and a first flat layer provided on a second surface on the opposite side of a surface of the first matching layer facing the wavelength conversion layer, the first flat layer entering the first recess of the light incident surface. A light refractive index of the first matching layer is an intermediate light refractive index between a light refractive index of the wavelength conversion layer and a light refractive index of the first flat layer.

10 Claims, 4 Drawing Sheets

REFLECTANCE [ % ]

5.00
4.50
4.00
3.50
3.00
2.50
2.00
1.50
1.00
0.50
0.00

400 420 440 460 480 500

WAVELENGTH [ nm ]

WAVELENGTH CONVERTER, LIGHT SOURCE DEVICE, AND PROJECTOR

The present application is based on, and claims priority from JP Application Serial Number 2022-184669, filed Nov. 18, 2022, the disclosure of which is hereby incorporated by reference herein in its entirety.

BACKGROUND

1. Technical Field

The present disclosure relates to a wavelength converter, a light source device, and a projector.

2. Related Art

As described in JP-T-2018-512617, there has been known an optical converter in which a ceramic light conversion material including a void is used. In such an optical converter, if the void is exposed to the surface of the ceramic light conversion material, since the flatness of the surface is lost, a reflection layer and the like that should be formed on the surface cannot be formed flat, leading to deterioration in light use efficiency. Therefore, in the optical converter described in JP-T-2018-512617, a filler layer made of a material such as $SiO_2$ is deposited on the surface of the ceramic light conversion material to fill the void to flatten the surface of the ceramic light conversion material.

However, when the filler layer is provided on the surface of the ceramic light conversion material as in the optical converter described in JP-T-2018-512617, interface reflection due to a light refractive index difference between the filler layer and the ceramic light conversion material occurs and a light loss occurs. Therefore, there is a limit in improvement of the light use efficiency.

SUMMARY

A wavelength converter according to an aspect of the present disclosure includes: a wavelength conversion layer including a recess on a surface thereof and configured to convert first light having a first wavelength into second light having a second wavelength different from the first wavelength; a first layer provided on a first surface among surfaces of the wavelength conversion layer; and a first flat layer provided on a surface on an opposite side of a surface of the first layer facing the wavelength conversion layer, the first flat layer entering the recess. A light refractive index of the first layer is an intermediate light refractive index between a light refractive index of the wavelength conversion layer and a light refractive index of the first flat layer.

A light source device according to an aspect of the present disclosure includes: the wavelength converter explained above; and a light emitting element configured to emit the first light toward the first surface of the wavelength conversion layer.

A projector according to an aspect of the present disclosure includes: the light source device explained above; a light modulation device configured to modulate, according to image information, light emitted from the light source device to thereby form image light; and a projection optical device configured to project the image light.

DESCRIPTION OF EMBODIMENTS

Figure 1:
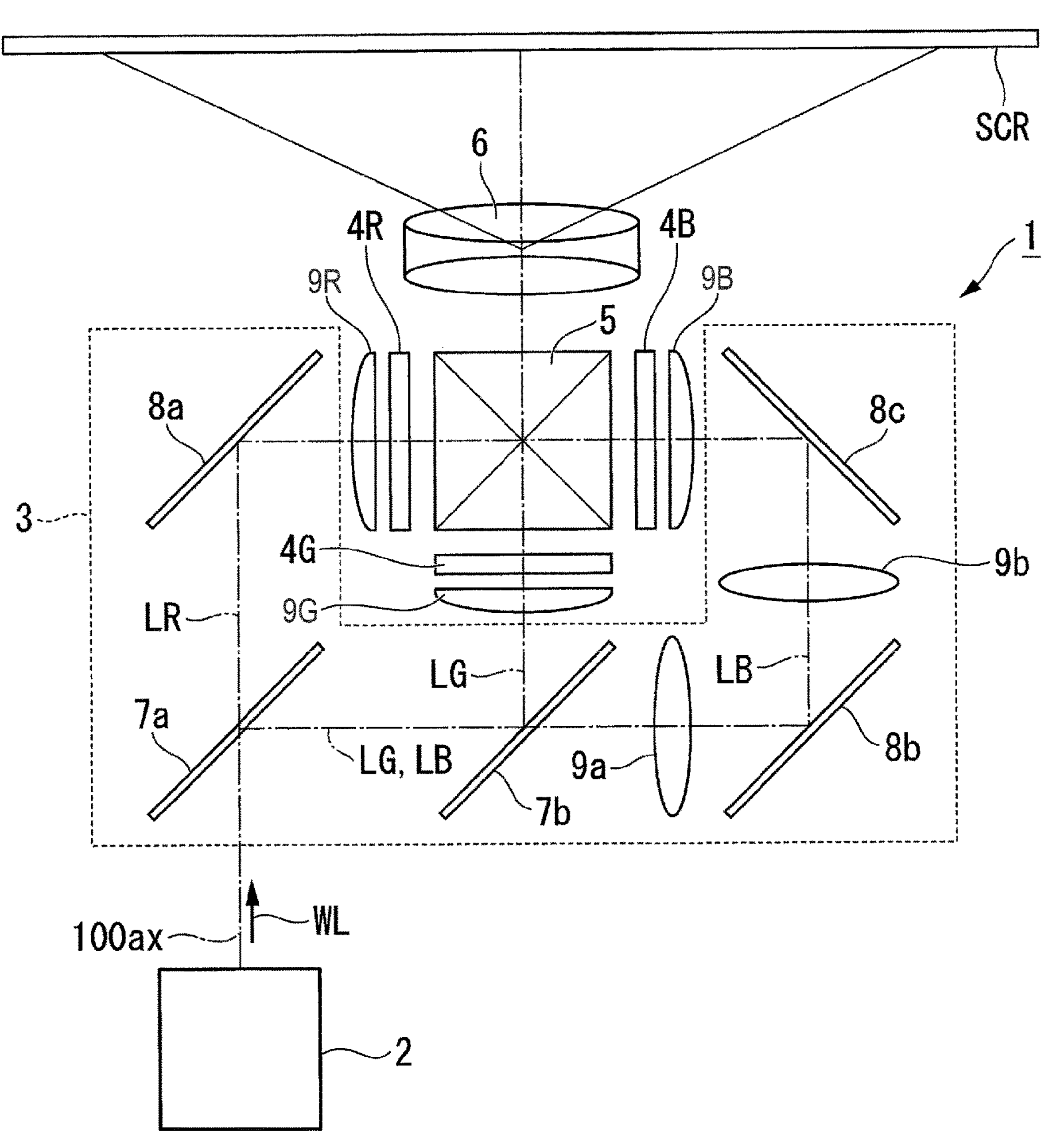
FIG. 1 is a diagram showing a schematic configuration of a projector according to this embodiment.

An embodiment of the present disclosure is explained in detail below with reference to the drawings.

Note that, in the drawings referred to in the following explanation, characteristic portions are sometimes enlarged and shown for convenience in order to clearly show characteristics. Dimension ratios and the like of components are not always the same as actual dimension ratios and the like.

Figure 2:
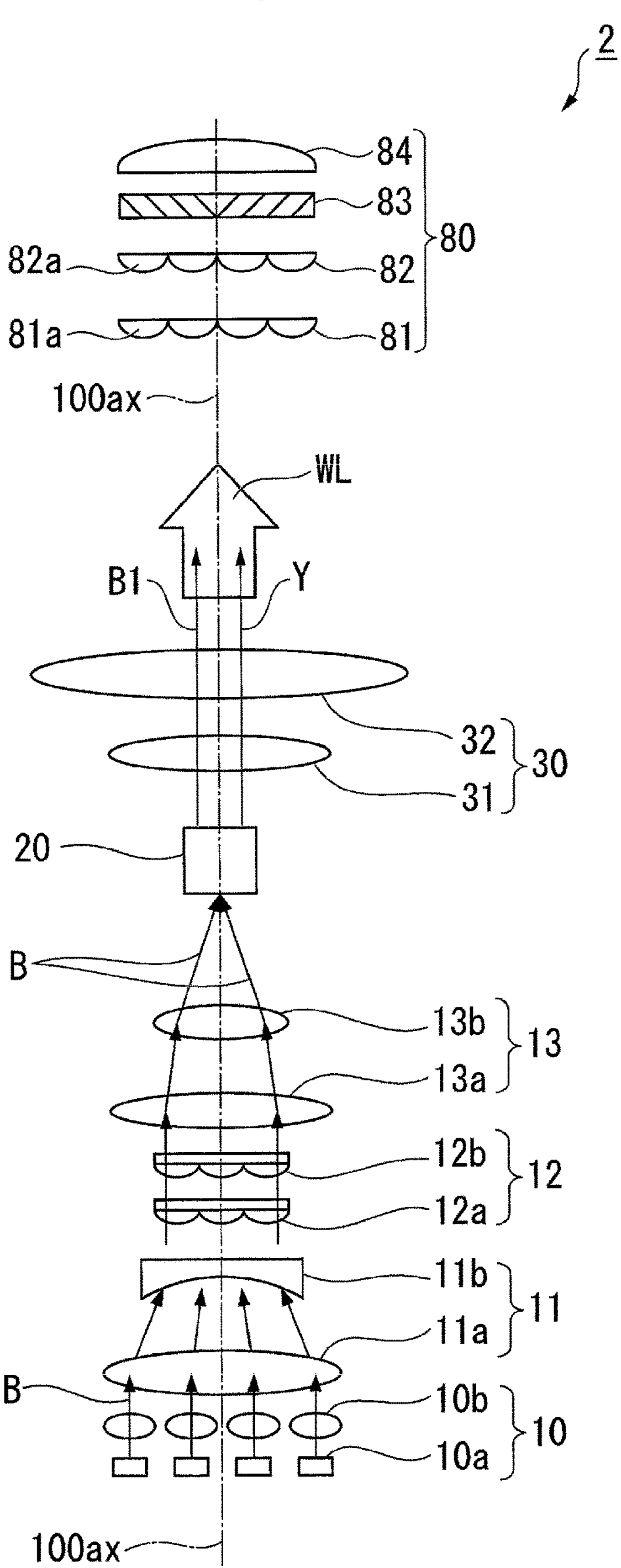
FIG. 2 is a diagram showing a schematic configuration of a light source device.

FIG. 1 is a diagram showing a schematic configuration of a projector 1 according to this embodiment. FIG. 2 is a diagram showing a schematic configuration of a light source device 2.

As shown in FIG. 1, the projector 1 in this embodiment is a projection-type image display device that displays an image on a screen SCR. The projector 1 includes a light source device 2, a color separation optical system 3, light modulation devices 4R, 4G, and 4B, a combination optical system 5, and a projection optical device 6.

The light source device 2 emits white illumination light WL toward the color separation optical system 3.

The color separation optical system 3 separates the illumination light WL emitted from the light source device 2 into red light LR, green light LG, and blue light LB. The color separation optical system 3 includes a first dichroic mirror *7a* and a second dichroic mirror *7b*, a first total reflection mirror *8a*, a second total reflection mirror *8b*, and a third total reflection mirror *8c*, a first relay lens *9a* and a second relay lens *9b*.

The first dichroic mirror *7a* separates the illumination light WL emitted from the light source device 2 into the red light LR and the other lights including the green light LG and the blue light LB. The first dichroic mirror *7a* transmits the red light LR and reflects the other lights (the green light LG and the blue light LB). On the other hand, the second dichroic mirror *7b* reflects the green light LG and transmits the blue light LB to thereby separates the other lights (the green light LG and the blue light LB) into the green light LG and the blue light LB.

The first total reflection mirror *8a* is disposed in an optical path of the red light LR and reflects the red light LR transmitted through the first dichroic mirror *7a* toward the light modulation device 4R. On the other hand, the second total reflection mirror *8b* and the third total reflection mirror *8c* are disposed in an optical path of the blue light LB and guide the blue light LB transmitted through the second dichroic mirror *7b* to the light modulation device 4B. The green light LG is reflected from the second dichroic mirror *7b* toward the light modulation device 4G.

The first relay lens *9a* is disposed on a light incident side of the second total reflection mirror *8b* in the optical path of the blue light LB. The second relay lens *9b* is disposed on a light emission side of the second total reflection mirror *8b* in the optical path of the blue light LB. The first relay lens 9*a* and the second relay lens 9*b* have a function of compensating for a light loss of the blue light LB that occurs because an optical path length of the blue light LB is longer than optical path lengths of the red light LR and the green light LG.

The light modulation devices 4R, 4G, and 4B modulate, according to image information, lights emitted from the light source device 2 to thereby form image lights. Specifically, the light modulation device 4R modulates the red light LR according to the image information and forms image light corresponding to the red light LR. The light modulation device 4G modulates the green light LG according to the image information and forms image light corresponding to the green light LG. The light modulation device 4B modulates the blue light LB according to the image information and forms image light corresponding to the blue light LB.

For example, transmissive liquid crystal panels are used in the light modulation devices 4R, 4G, and 4B. Polarizing plates (not shown) are disposed on each of an incident side and an emission side of the liquid crystal panels.

Field lenses 9R, 9G, and 9B are respectively disposed on the incident side of the light modulation devices 4R, 4G, and 4B. The field lenses 9R, 9G, and 9B respectively collimate the red light LR, the green light LG, and the blue light LB respectively made incident on the light modulation devices 4R, 4G, and 4B.

The image lights emitted from the light modulation devices 4R, 4G, and 4B are made incident on the combination optical system 5. The combination optical system 5 combines the image lights corresponding to the red light LR, the green light LG, and the blue light LB and emits the combined image light toward the projection optical device 6. For example, a cross dichroic prism is used in the combination optical system 5.

The projection optical device 6 includes a projection lens group and projects the image light combined by the combination optical system 5 toward the screen SCR. Consequently, an enlarged image is displayed on the screen SCR.

Subsequently, a configuration of the light source device 2 is explained.

As shown in FIG. 2, the light source device 2 includes an excitation light source unit 10, an afocal optical system 11, a homogenizer optical system 12, a condensing optical system 13, a wavelength converter 20, a pickup optical system 30, and an uniform illumination optical system 80.

The excitation light source unit 10 includes a plurality of semiconductor lasers 10*a* that emit blue excitation light B formed by laser light and a plurality of collimator lenses 10*b*. A peak wavelength of light emission intensity of the excitation light Bis, for example, 450 nm. The plurality of semiconductor lasers 10*a* are disposed in an array in one plane orthogonal to an illumination optical axis 100*ax*. Note that, as the semiconductor lasers 10*a*, semiconductor lasers that emit blue light having a wavelength other than 450 nm, for example, a wavelength of 455 nm or 460 nm can also be used. The semiconductor lasers 10*a* are equivalent to the light emitting elements. The excitation light B is equivalent to the first light and a wavelength of the excitation light Bis equivalent to the first waveform.

The collimator lenses 10*b* are disposed in an array in one plane orthogonal to the illumination optical axis 100*ax* corresponding to the semiconductor lasers 10*a*. The collimator lenses 10*b* convert the excitation light B emitted from the corresponding semiconductor lasers 10*a* into parallel lights.

The afocal optical system 11 includes, for example, a convex lens 11*a* and a concave lens 11*b*. The afocal optical system 11 reduces a light beam diameter of the excitation light B including parallel light beams emitted from the excitation light source unit 10.

The homogenizer optical system 12 includes, for example, a first multi-lens array 12*a* and a second multi-lens array 12*b*. The homogenizer optical system 12 brings a light intensity distribution of the excitation light B into a uniform state, a so-called top-hat distribution on a wavelength conversion layer 22 (see FIG. 3) explained below. The homogenizer optical system 12 superimposes a plurality of small light beams emitted from a plurality of lenses of the first multi-lens array 12*a* and the second multi-lens array 12*b* on one another on the waveform conversion element 20 in conjunction with the condensing optical system 13. Consequently, the homogenizer optical system 12 brings a light intensity distribution of the excitation light B irradiated on the wavelength converter 20 into a uniform state.

The condensing optical system 13 includes, for example, a first lens 13*a* and a second lens 13*b*. In this embodiment, the first lens 13*a* and the second lens 13*b* are respectively configured from convex lenses. The condensing optical system 13 is disposed in an optical path from the homogenizer optical system 12 to the wavelength converter 20 and condenses the excitation light B and makes the excitation light B incident on the wavelength converter 20.

The wavelength converter 20 converts a part of the blue excitation light B made incident thereon into fluorescent light Y (see FIG. 3) and emits the white illumination light WL including blue light B1, which is another part of the excitation light B, and the fluorescent light Y. A configuration of the wavelength converter 20 is explained below.

The pickup optical system 30 includes, for example, a first collimate lens 31 and a second collimate lens 32. The pickup optical system 30 is a collimating optical system that substantially collimates light emitted from the wavelength converter 20. The first collimate lens 31 and the second collimate lens 32 are respectively configured from convex lenses.

The light collimated by the pickup optical system 30 is made incident on the uniform illumination optical system 80. The uniform illumination optical system 80 includes a first lens array 81, a second lens array 82, a polarization conversion element 83, and a superimposing lens 84.

The first lens array 81 includes a plurality of first lenses 81*a* for dividing the illumination light WL emitted from the wavelength converter 20 into a plurality of partial light beams. The plurality of first lenses 81*a* are arrayed in a matrix in a plane orthogonal to the illumination optical axis 100*ax*.

The second lens array 82 includes a plurality of second lenses 82*a* corresponding to the plurality of first lenses 81*a* of the first lens array 81. The plurality of second lenses 82*a* are arrayed in a matrix in a plane orthogonal to the illumination optical axis 100*ax*.

The second lens array 82 forms, in conjunction with the superimposing lens 84, images of the first lenses 81*a* of the first lens array 81 respectively near image forming regions of the light modulation device 4R, the light modulation device 4G, and the light modulation device 4B.

The polarization conversion element 83 converts light emitted from the second lens array 82 into linearly polarized light. The polarization conversion element 83 includes, for example, a polarization separation film and a phase difference plate (not shown).

The superimposing lens 84 condenses the partial light beams emitted from the polarization conversion element 83 and superimposes the partial light beams respectively near the image forming regions of the light modulation device 4R, the light modulation device 4G, and the light modulation device 4B.

Subsequently, a configuration of the wavelength converter 20 is explained.

Figure 3:
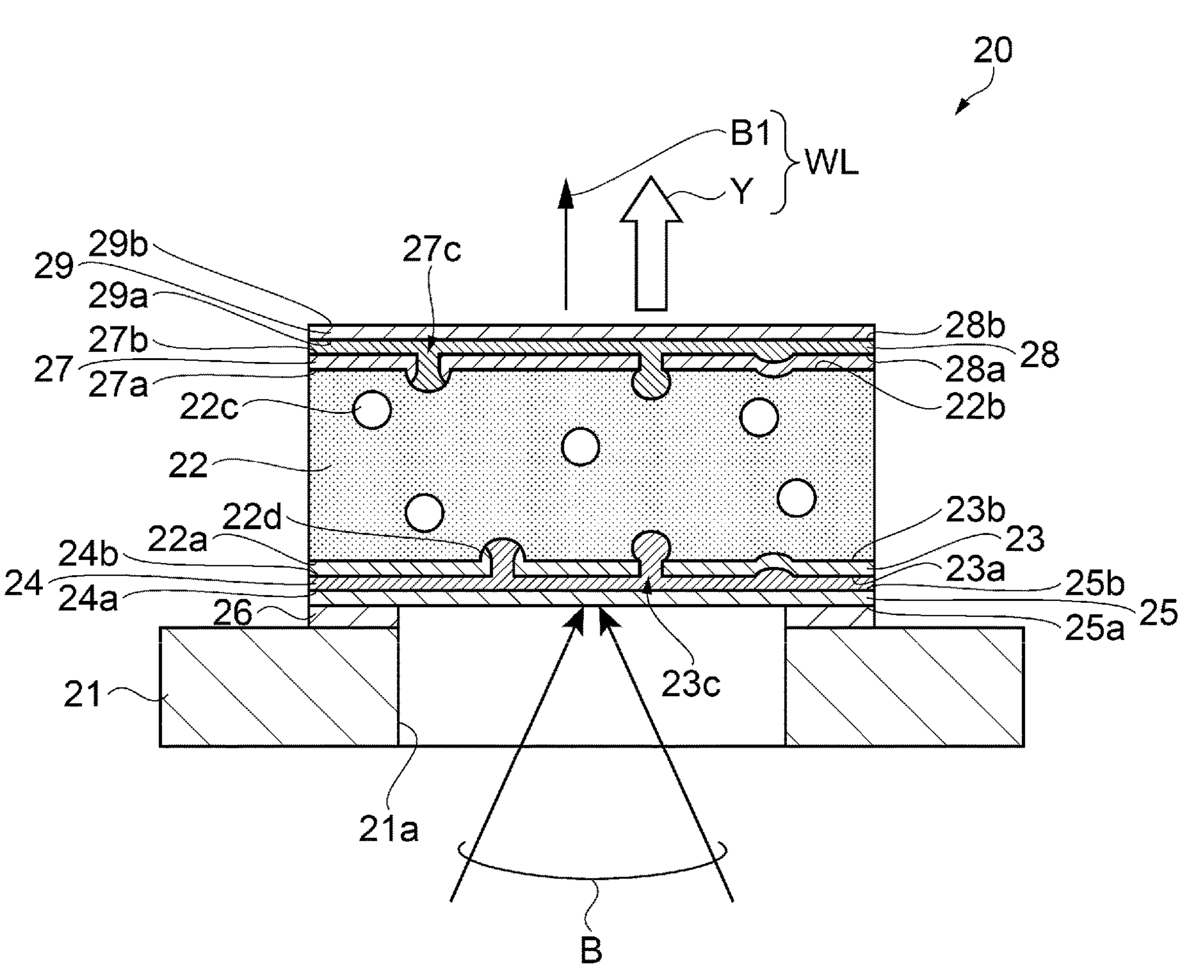
FIG. 3 is a sectional view showing a main part configuration of a wavelength converter.

FIG. 3 is a sectional view showing a main part configuration of the wavelength converter 20. Note that FIG. 3 is equivalent to a cross section of the wavelength converter 20 taken along a plane including the illumination optical axis 100*ax* shown in FIG. 2.

As shown in FIG. 3, the wavelength converter 20 includes a heat radiation base material 21, a wavelength conversion layer 22, a first matching layer 23, a first flat layer 24, a dichroic layer 25, a bonding member 26, a second matching layer 27, a second flat layer 28, and a reflection prevention layer 29. The wavelength converter 20 in this embodiment is a stationary phosphor that does not temporally change an incident position of the excitation light B on the wavelength conversion layer 22.

The heat radiation base material 21 is configured with a metal material excellent in a heat radiation property such as aluminum or copper. The heat radiation base material 21 is a supporting member that supports the wavelength conversion layer 22. The wavelength conversion layer 22 is supported by the heat radiation base material 21 via the bonding member 26. Although not shown, the heat radiation base material 21 may further include a heat radiation member in order to improve heat radiation efficiency. The heat radiation member is configured from, for example, a heat sink and includes structure including a plurality of fins. The heat radiation base material 21 in this embodiment is configured with a non-light transmitting member.

The excitation light B is made incident on the wavelength conversion layer 22 via a through-hole 21*a* formed in the heat radiation base material 21. That is, the heat radiation base material 21 is a member that supports a region different from an incident region of the wavelength conversion layer 22 where the excitation light B is made incident and receives heat generated in the wavelength conversion layer 22 and radiates the heat to the outside. That is, the heat radiation base material 21 supports the wavelength conversion layer 22 in a portion excluding the through-hole 21*a*.

The wavelength conversion layer 22 includes a light incident surface 22*a* on which the excitation light B emitted from the excitation light source unit 10 is made incident and a light emission surface 22*b* on the opposite side of the light incident surface 22*a*. As shown in FIG. 3, in this embodiment, the wavelength conversion layer 22 includes a plurality of pores 22*c* provided on the inside. The wavelength conversion layer 22 has a light scattering characteristic by including the plurality of pores 22*c*.

A part of the plurality of pores 22*c* is exposed to the surface of the wavelength conversion layer 22. Therefore, recesses 22*d* are formed by the pores 22*c* on the light incident surface 22*a* and the light emission surface 22*b*, which are surfaces of the wavelength conversion layer 22. That is, the wavelength conversion layer 22 includes the recesses 22*d* on a surface thereof.

The wavelength conversion layer 22 is a transmissive wavelength conversion layer that converts the excitation light B made incident from the light incident surface 22*a* into the fluorescent light Y and emits the converted fluorescent light Y from the light emission surface 22*b*. A wavelength of the fluorescent light Y is different from a wavelength of the excitation light B. Specifically, the fluorescent light Y is yellow light having a peak wavelength in a wavelength region of 500 to 700 nm. Note that the fluorescent light Y is equivalent to the second light and the wavelength of the fluorescent light Y is equivalent to the second wavelength. The light incident surface 22*a* of the wavelength conversion layer 22 is equivalent to the first surface and the light emission surface 22*b* of the wavelength conversion layer 22 is equivalent to the second surface.

In this embodiment, the wavelength conversion layer 22 is a ceramics phosphor formed by baking phosphor particles. As the phosphor particles configuring the wavelength conversion layer 22, a yttrium-aluminum-garnet (YAG)-based phosphor containing Ce ions is used. That is, the wavelength conversion layer 22 in this embodiment includes the YAG-based phosphor. A light refractive index of the wavelength conversion layer 22 in this embodiment is 1.83.

When YAG:Ce is taken as an example, as the phosphor particles, particles containing a material obtained by mixing material powder containing elements such as yttrium oxide ($Y_2O_3$), aluminum oxide ($Al_2O_3$), and cerium oxide ($CeO_2$) and causing solid-phase reaction of the material powder, Y—Al—O amorphous particles obtained by a wet method such as a coprecipitation method or a sol-gel method, YAG particles obtained by a gas-phase method such as a spray-drying method, a flame pyrolysis method, or a heat plasma method, or the like can be used.

Note that a material forming the phosphor particle may be one type or particles formed using two or more types of materials may be used. As the wavelength conversion layer 22, a wavelength conversion layer formed by dispersing the phosphor particles in an inorganic binder such as alumina, a wavelength conversion layer formed by baking a glass binder, which is an inorganic material, and the phosphor particles, or the like is suitably used. The wavelength conversion layer 22 may be formed by baking the phosphor particles without using a binder.

The wavelength conversion layer 22 in this embodiment converts a wavelength of a part of the blue excitation light B emitted from the excitation light source unit 10 and generates yellow fluorescent light Y. The wavelength conversion layer 22 emits the white illumination light WL obtained by combining the generated fluorescent light Y and another part of the excitation light B, that is, the blue light B1 that passes through the wavelength conversion layer 22 without a wavelength being changed.

A white balance of the illumination light WL emitted from the wavelength conversion layer 22 is determined by a BY ratio, which is a light amount ratio of a light amount of the blue light B1 and a light amount of the fluorescent light Y. In the projector 1, conditions for obtaining a practical white balance for the illumination light WL are that, for example, the BY ratio is 50%, that is, the blue light B1 is 50% and the fluorescent light Y is 50%. The BY radio is determined according to at least a content of the phosphor particles in the wavelength conversion layer 22.

It is known that the BY ratio is affected by the thickness of the wavelength conversion layer 22. For example, if the thickness of the wavelength conversion layer 22 having a fixed YAG ratio is relatively reduced, a light amount of the blue light B1 passing through the wavelength conversion layer 22 can be increased. However, if the thickness of the wavelength conversion layer 22 is smaller than 40 μm, it is difficult to manufacture the wavelength conversion layer 22. Therefore, from the viewpoint of manufacturing, it is desirable to set a lower limit value of the thickness of the wavelength conversion layer 22 to 40 μm.

If the thickness of the wavelength conversion layer 22 having the fixed YAG ratio is relatively increased, the light amount of the blue light B1 passing through the wavelength conversion layer 22 decreases. Further, if the thickness of the wavelength conversion layer 22 exceeds 300 μm, since reabsorption of the fluorescent light Y occurs in the wavelength conversion layer 22, a light amount of the fluorescent light Y that can be extracted from the light emission surface 22*b* decreases. Therefore, from the viewpoint of light use efficiency of the fluorescent light Y, it is desirable to set an upper limit value of the thickness of the wavelength conversion layer 22 to 300 μm.

The thickness of the wavelength conversion layer 22 in this embodiment is set to 40 μm or more and 300 μm or less based on the viewpoints explained above.

As shown in FIG. 3, the first matching layer 23 is provided on the light incident surface 22*a* of the wavelength conversion layer 22. In other words, the first matching layer 23 is disposed between the wavelength conversion layer 22 and the first flat layer 24 explained below. The first matching layer 23 includes a light incident surface 23*a* on which light is made incident from the first flat layer 24 and a light emission surface 23*b* from which light is emitted to the wavelength conversion layer 22. The first matching layer 23 is equivalent to the first layer.

In this embodiment, the first matching layer 23 is a single layer made of aluminum oxide ($Al_2O_3$), a light refractive index of which is 1.64. The first matching layer 23 is formed by, for example, an evaporation method or a sputtering method. Note that the material of the first matching layer 23 is not limited to $Al_2O_3$. The material of the first matching layer 23 may be a composite material containing, for example, yttrium fluoride ($YF_3$), zinc oxide ($ZnO_2$), and titanium monoxide (TiO). The first matching layer 23 is not limited to the single layer. The first matching layer 23 may be a multilayer film configured to suppress reflection of excitation light B by, for example, combining a layer having a high light refractive index and a layer having a low light refractive index.

In positions of the first matching layer 23 facing the recesses 22*d* formed on the surface of the wavelength conversion layer 22, in some case, the first matching layer 23 is not formed to cover the recesses 22*d* and openings 23*c* are formed.

The first flat layer 24 is provided on the light incident surface 23*a* of the first matching layer 23, that is, a surface on the opposite side of the surface of the first matching layer 23 facing the wavelength conversion layer 22. In other words, the first flat layer 24 is disposed between the first matching layer 23 and the dichroic layer 25 explained below. The first flat layer 24 includes a light incident surface 24*a* on which light is made incident from the dichroic layer 25 and a light emission surface 24*b* from which light is emitted to the first matching layer 23.

The first flat layer 24 enters the recesses 22*d* of the light incident surface 22*a* of the wavelength conversion layer 22 via the openings 23*c* of the first matching layer 23 and is formed such that the light incident surface 24*a* is substantially flattened. That is, the light incident surface 24*a* of the first flat layer 24 is formed substantially flat even if the openings 23*c* due to the recesses 22*d* of the wavelength conversion layer 22 are formed in a part of the first matching layer 23.

As the material of the first flat layer 24, an inorganic material having light transmissivity, for example, silicon dioxide ($SiO_2$) is used. In this embodiment, the first flat layer 24 made of $SiO_2$ is formed by baking a polysilazane solution. A light refractive index of $SiO_2$, which is the first flat layer 24, is 1.43. The first flat layer 24 has a light refractive index different from the light refractive index of the wavelength conversion layer 22. Note that the material of the first flat layer 24 is not limited to the $SiO_2$. The material of the first flat layer 24 may be a composite material containing, for example, silicon oxide nitride (SiON), yttrium fluoride ($YF_3$), and silicon nitride (SiNx).

The first flat layer 24 also has a function of a stress relaxation layer that relaxes stress due to heat generated in the wavelength conversion layer 22. In this embodiment, the first flat layer 24 is set to thickness equal to or smaller than the half of the thickness of the wavelength conversion layer 22. By setting the first flat layer 24 to such thickness, it is possible to cause the first flat layer 24 to satisfactorily exert the stress relaxation function described above.

The dichroic layer 25 is provided on the light incident surface 24*a* of the first flat layer 24, that is, a surface on the opposite side of a surface of the first flat layer 24 facing the first matching layer 23. The dichroic layer 25 includes a light incident surface 25*a* on which the excitation light B is made incident and a light emission surface 25*b* from which light is emitted to the first flat layer 24. In this embodiment, light emitted from the excitation light source unit 10 is directly made incident on the dichroic layer 25. However, when another member that transmits light such as a transparent substrate is provided in a light incident region, the light may be made incident on the dichroic layer 25 via the other member. The dichroic layer 25 is equivalent to the reflection layer.

The dichroic layer 25 is formed substantially flat by being provided on the light incident surface 24*a* formed substantially flat of the first flat layer 24. The dichroic layer 25 has a characteristic of transmitting the excitation light B and reflecting the fluorescent light Y. The dichroic layer 25 reflects the fluorescent light Y generated in the wavelength conversion layer 22 and emitted from the light incident surface 22*a* to the first matching layer 23 side. Therefore, the light use efficiency of the fluorescent light Y is improved.

Here, it is assumed that the flatness of the light incident surface 22*a* is low. In this case, it is difficult to satisfactorily form the dichroic layer 25. If the dichroic layer 25 cannot be satisfactorily formed on the light incident surface 22*a*, an ideal reflectance is not obtained. Since the fluorescent light Y cannot be reflected toward the light incident surface 22*a*, the light use efficiency of the fluorescent light Y is deteriorated.

In contrast, in the wavelength converter 20 in this embodiment, the recesses 22*d* are sealed by the first flat layer 24 to form the first flat layer 24 including a substantially flattened surface. Here, the substantially flattened surface means a degree of flatness enough for satisfactorily forming the dichroic layer 25 with vapor deposition or the like. A degree of unevenness not preventing the formation of the dichroic layer 25 is allowed.

The wavelength converter 20 in this embodiment includes the uniform dichroic layer 25 formed on the first flat layer 24. That is, in the wavelength converter 20 in this embodiment, the dichroic layer 25 is uniformly formed over the entire region on the light incident surface 24*a*.

As shown in FIG. 3, the second matching layer 27 is provided on the light emission surface 22*b* of the wavelength conversion layer 22, that is, a surface of the wavelength conversion layer 22 on the opposite side of the light incident surface 22*a*. In other words, the second matching layer 27 is disposed between the wavelength conversion layer 22 and the second flat layer 28 explained below. The second matching layer 27 includes a light incident surface 27*a* on which light is made incident from the wavelength conversion layer 22 and a light emission surface 27*b* from which light is emitted to the second flat layer 28. The second matching layer 27 is equivalent to the second layer.

In this embodiment, like the first matching layer 23, the second matching layer 27 is a single layer made of $Al_2O_3$. The material of the second matching layer 27 is not limited to $Al_2O_3$. The material of the second matching layer 27 may be a composite material containing, for example, $YF_3$, $ZnO_2$, and TiO. The second matching layer 27 is not limited to the single layer. The second matching layer 27 may be, for example, a multilayer film configured to suppress reflection of the excitation light B by combining a layer having a high light refractive index and a layer having a low light refractive index. Note that, in this embodiment, the same material is used for the first matching layer 23 and the second matching layer 27. However, materials different from each other may be used for the first matching layer 23 and the second matching layer 27.

As in the first matching layer 23, in the second matching layer 27, in positions facing the recesses 22*d* formed on the surface of the wavelength conversion layer 22, in some case, the second matching layer 27 is not formed to cover the recesses 22*d* and openings 27*c* are formed.

The second flat layer 28 is provided on the light emission surface 27*b* of the second matching layer 27, that is, a surface on the opposite side of a surface of the second matching layer 27 facing the wavelength conversion layer 22. In other words, the second flat layer 28 is disposed between the second matching layer 27 and the reflection prevention layer 29 explained below. The second flat layer 28 includes a light incident surface 28*a* on which light is made incident from the second matching layer 27 and a light emission surface 28*b* from which light is emitted to the reflection prevention layer 29.

The second flat layer 28 enters the recesses 22*d* of the light emission surface 22*b* of the wavelength conversion layer 22 via the openings 27*c* of the second matching layer 27 and is formed such that the light emission surface 28*b* is substantially flattened. That is, the light emission surface 28*b* of the second flat layer 28 is formed substantially flat even if the openings 27*c* due to the recesses 22*d* of the wavelength conversion layer 22 are formed in a part of the second matching layer 27.

As the material of the second flat layer 28, like the first flat layer 24, an inorganic material having light transmissivity, for example, $SiO_2$ is used. Note that the material of the second flat layer 28 is not limited to $Sio_2$. For example, the material of the second flat layer 28 may be a composite material containing, for example, SiON, $YF_3$, and SiNx. In this embodiment, the same material is used for the first flat layer 24 and the second flat layer 28. However, materials different from each other may be used for the first flat layer 24 and the second flat layer 28.

The second flat layer 28 also has a function of a stress relaxation layer that relaxes stress due to heat generated in the wavelength conversion layer 22. In this embodiment, the second flat layer 28 is set to thickness equal to or smaller than the half of the thickness of the wavelength conversion layer 22. By setting the second flat layer 28 to such thickness, it is possible to cause the second flat layer 28 to satisfactorily exert the stress relaxation function described above.

The reflection prevention layer 29 is provided on the light emission surface 28*b* of the second flat layer 28, that is, a surface on the opposite side of a surface of the second flat layer 28 facing the second matching layer 27. The reflection prevention layer 29 includes a light incident surface 29*a* on which light is made incident from the second flat layer 28 and a light emission surface 29*b* from which light is emitted to the outside. Since the light emission surface 28*b* of the second flat layer 28 is substantially flat, the reflection prevention layer 29 is also formed substantially flat. Note that, in this embodiment, the heat radiation base material 21 is bonded to the light incident surface 25*a* of the dichroic layer 25 via the bonding member 26. However, the wavelength conversion layer 22 may be supported by bonding the heat radiation base material 21 to the light emission surface 29*b* of the reflection prevention layer 29.

The reflection prevention layer 29 has a characteristic of transmitting the excitation light B and the fluorescent light Y emitted from the wavelength conversion layer 22. By providing such a reflection prevention layer 29, it is possible to prevent the illumination light WL emitted from the light emission surface 22*b* of the wavelength conversion layer 22 from being reflected to the wavelength conversion layer 22 side when being emitted to the outside. Consequently, it is possible to efficiently extract, from the wavelength conversion layer 22, the illumination light WL generated in the wavelength conversion layer 22.

As explained above, the reflection prevention layer 29 is a layer that suppresses reflection of light in an interface between the second flat layer 28 and the air. The reflection prevention layer 29 may be configured with alternately stacking a layer having a low light refractive index made of $SiO_2$ or the like and a layer having a high light refractive index made of tantalum pentoxide ($Ta_2O_5$) or the like.

Details of the first matching layer 23 and the second matching layer 27 are explained below.

As explained above, in the embodiment, the first matching layer 23 is provided between the wavelength conversion layer 22 and the first flat layer 24. The light refractive index of the first matching layer 23 is 1.64 and is an intermediate light refractive index between 1.83 that is the light refractive index of the wavelength conversion layer 22 and 1.43 that is the light refractive index of the first flat layer 24.

Here, it is assumed that the first matching layer 23 is not disposed between the first flat layer 24 and the wavelength conversion layer 22. In this case, since the first flat layer 24 and the wavelength conversion layer 22 have different light refractive indexes, interface reflection due to a light refractive index difference occurs. Therefore, a part of light emitted from the first flat layer 24 toward the wavelength conversion layer 22 is reflected to the first flat layer 24 side, a light loss occurs, and the light use efficiency is deteriorated.

In contrast, the wavelength converter 20 in this embodiment includes, between the wavelength conversion layer 22 and the first flat layer 24, the first matching layer 23 having the intermediate light refractive index between the light refractive index of the first flat layer 24 and the light refractive index of the wavelength conversion layer 22. Therefore, a light refractive index difference between the wavelength conversion layer 22 and the first matching layer 23 and a light refractive index difference between the first matching layer 23 and the first flat layer 24 are respectively smaller than a light refractive index difference between the wavelength conversion layer 22 and the first flat layer 24. Consequently, it is possible to suppress interface reflection that occurs in the wavelength converter 20. It is possible to suppress a light loss due to the interface reflection and improve the light use efficiency.

Here, it is ideal that n satisfies a relation of the following Expression (1):

$$n=\sqrt{n1\cdot n2} \quad (1),$$

where n represents the light refractive index of the first matching layer 23, n1 represents the light refractive index of the wavelength conversion layer 22, and n2 represents the light refractive index of the first flat layer 24.

Since the first matching layer 23 has a light refractive index satisfying Expression (1), it is possible to suppress reflection of light that occurs between the wavelength conversion layer 22 and the first flat layer 24. Realistically, n desirably satisfies a relation of the following Expression (2) and more desirably satisfies a relation of the following Expression (3).

$$\sqrt{n1 \cdot n2}-0.1<n<\sqrt{n1 \cdot n2}+0.1 \quad (2)$$

$$\sqrt{n1 \cdot n2}-0.05<n<\sqrt{n1 \cdot n2}+0.05 \quad (3)$$

In this embodiment, both of Expression (2) and Expression (3) hold because n1=1.83, n2=1.43, and n=1.64. In other words, the material of the first matching layer 23 is selected such that Expression (2) or Expression (3) holds.

It is ideal that an optical distance (n·d) satisfies the following Expression (4):

$$n \cdot d=\lambda/4 \quad (4),$$

where n represents the light refractive index of the first matching layer 23, λ represents the wavelength of the excitation light B, and d represents the film thickness of the first matching layer 23.

That is, an ideal film thickness of the first matching layer 23 can be calculated using Expression (4). Here, a measurement value of the film thickness is desirably within ±20% of the ideal value calculated by Expression (4) and more desirably within +10% of the ideal value.

When Expression (4) is satisfied, a phase of reflected light that occurs in an interface between the first flat layer 24 and the first matching layer 23 and a phase of reflected light that occurs in an interface between the first matching layer 23 and the wavelength conversion layer 22 are opposite. The reflected lights causes interference, whereby reflection between the wavelength conversion layer 22 and the first flat layer 24 is further suppressed. Note that, when the first matching layer 23 is configured by a multilayer film, optical distances among the layers only have to be defined by λ/4, λ/2, or the like to reduce reflected waves in interfaces among the layers.

As explained above, the configuration of the second matching layer 27 is the same as the configuration of the first matching layer 23. Specifically, a light refractive index of the second matching layer 27 provided between the wavelength conversion layer 22 and the second flat layer 28 is 1.64 and is an intermediate light refractive index between 1.83 that is the light refractive index of the wavelength conversion layer 22 and 1.43 that is a light refractive index of the second flat layer 28. Therefore, a light refractive index difference between the wavelength conversion layer 22 and the second matching layer 27 and a light refractive index difference between the second matching layer 27 and the second flat layer 28 are respectively smaller than a light refractive index difference between the wavelength conversion layer 22 and the second flat layer 28. Consequently, it is possible to suppress interface reflection that occurs in the wavelength converter 20. It is possible to suppress a light loss due to the interface reflection and improve the light use efficiency.

Here, it is ideal that n satisfies the relation of Expression (1) described above, where n represents the light refractive index of the second matching layer 27, n1 represents the light refractive index of the wavelength conversion layer 22, and n2 represents the light refractive index of the second flat layer 28. However, realistically, it is desirable that the relation of Expression (2) described above is satisfied and it is more desirable that the relation of Expression (3) described above is satisfied. In this embodiment, both of Expression (2) and Expression (3) hold because n1=1.83, n2=1.43, and n=1.64. In other words, the material of the second matching layer 27 is selected such that Expression (2) or Expression (3) holds.

It is ideal that the optical distance (n·d) satisfies Expression (4) described above, where n represents the light refractive index of the second matching layer 27, λ represents the wavelength of the excitation light B, and d represents the film thickness of the second matching layer 27. That is, an ideal film thickness of the second matching layer 27 can be calculated using Expression (4). Here, a measurement value of the film thickness is desirably within ±20% of the ideal value calculated by Expression (4) and more desirably within ±10% of the ideal value.

Figures 4, 5:
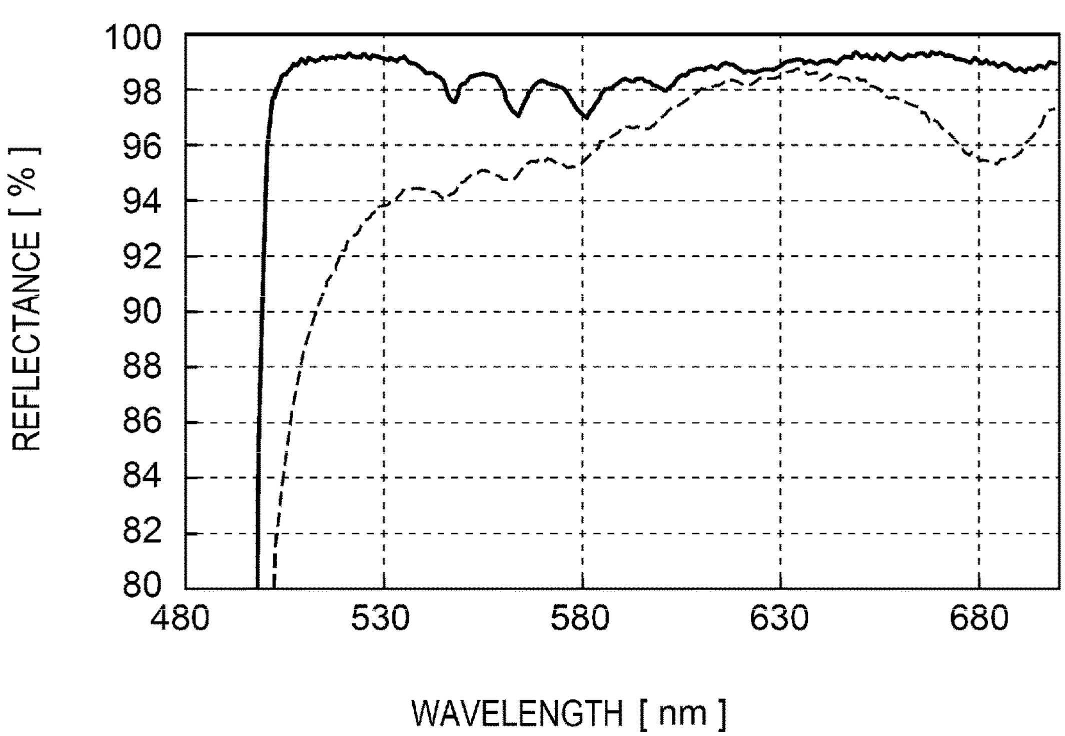
FIG. 4 is a graph showing a reflectance of a dichroic layer for fluorescent light.
FIG. 5 is a graph showing a reflectance of the dichroic layer for excitation light.

FIG. 4 is a graph showing an average reflectance of the dichroic layer 25 near a wavelength region of the fluorescent light Y. In FIG. 4, the horizontal axis indicates a wavelength of light made incident on the dichroic layer 25 and the vertical axis indicates an average reflectance of the dichroic layer 25. The average reflectance is an average value of a reflectance that fluctuates depending on a position in the dichroic layer 25. In FIG. 4, as a comparative example, an average reflectance in the case in which the dichroic layer 25 is formed on the light incident surface 22*a* of the wavelength conversion layer 22 without the first flat layer 24 being formed is shown.

As shown in FIG. 4, in the dichroic layer 25 in this embodiment, that is, the dichroic layer 25 formed on the first flat layer 24, for the fluorescent light Y, the average reflectance is higher than the average reflectance in the comparative example. Therefore, the fluorescent light Y emitted from the light incident surface 22*a* side of the wavelength conversion layer 22 is efficiently reflected in an original emission direction by the dichroic layer 25. The light use efficiency is improved.

FIG. 5 is a graph showing an average reflectance of the dichroic layer 25 near a wavelength region of the excitation light B. In FIG. 5, the horizontal axis indicates a wavelength of light made incident on the dichroic layer 25 and the vertical axis indicates an average reflectance of the dichroic layer 25. In FIG. 5, an average reflectance in the case in which the film thickness of the first flat layer 24 is changed by 10 nm at a time in a range of 410 nm to 490 nm is also shown.

As shown in FIG. 5, in this embodiment, irrespective of the film thickness of the first flat layer 24, the average reflectance of the dichroic layer 25 for the excitation light B was 4% or lower in a range in which a wavelength was 445 nm to 490 nm. In particular, in a range in which the wavelength was 450 nm to 485 nm, the average reflectance was 2% or lower. In this embodiment, a difference between a maximum reflectance and a minimum reflectance of the dichroic layer 25 for the excitation light B was 2% or smaller. Therefore, even if a manufacturing error occurs in the film thickness of the first flat layer 24, the incident excitation light B is prevented from being reflected and the light use efficiency is improved. Note that the maximum reflectance and the minimum reflectance are respectively a largest value and a smallest value of a reflectance that fluctuates depending on a position in the dichroic layer 25.

As explained above, with the wavelength converter 20, the light source device 2, and the projector 1 in this embodiment, it is possible to obtain the following effects.

With the wavelength converter 20 in this embodiment, since the first matching layer 23 having the intermediate light refractive index between the light refractive index of the wavelength conversion layer 22 and the light refractive index of the first flat layer 24 is disposed between the wavelength conversion layer 22 and the first flat layer 24, the light refractive index difference between the wavelength conversion layer 22 and the first matching layer 23 and the light refractive index difference between the first matching layer 23 and the first flat layer 24 are respectively smaller than the light refractive index difference between the wavelength conversion layer 22 and the first flat layer 24. Consequently, it is possible to suppress a light loss due to interface reflection that occurs in the wavelength converter 20 and improve the light use efficiency.

With the wavelength converter 20 in this embodiment, since the dichroic layer 25 reflects the fluorescent light Y emitted from the light incident surface 22*a* side of the wavelength conversion layer 22, the fluorescent light Y is prevented from being radiated to the outside from the light incident surface 22*a* side and the light use efficiency of the fluorescent light Y is improved.

With the wavelength converter 20 in this embodiment, since the first matching layer 23 has the light refractive index satisfying Expression (2) or Expression (3), it is possible to further suppress the reflection of the light that occurs between the wavelength conversion layer 22 and the first flat layer 24.

With the wavelength converter 20 in this embodiment, since the film thickness of the first matching layer 23 satisfies Expression (4), a phase of reflected light that occurs in the interface between the first flat layer 24 and the first matching layer 23 and a phase of reflected light that occurs in the interface between the first matching layer 23 and the wavelength conversion layer 22 are opposite. Therefore, the reflected lights cause interference, whereby the reflection between the wavelength conversion layer 22 and the first flat layer 24 is further suppressed.

With the wavelength converter 20 in this embodiment, the average reflectance of the dichroic layer 25 for the excitation light B is 4% or lower and the difference between the maximum reflectance and the minimum reflectance of the dichroic layer 25 for the excitation light B is 2% or smaller. That is, since a reflectance for the excitation light B is suppressed to be small and fluctuation in the reflectance of the dichroic layer 25 for the excitation light B due to, for example, fluctuation in the film thickness of the first flat layer 24 is suppressed. Therefore, the light use efficiency is improved.

With the wavelength converter 20 in this embodiment, when the wavelength conversion layer 22 is a YAG-based phosphor and the first flat layer 24 is $SiO_2$, since $Al_2O_3$ having the intermediate light refractive index between the light refractive index of the wavelength conversion layer 22 and the light refractive index of the first flat layer 24 is adopted in the first matching layer 23, it is possible to realize the wavelength converter 20 having high light use efficiency.

With the wavelength converter 20 in this embodiment, since the second matching layer 27 having the intermediate light refractive index between the light refractive index of the wavelength conversion layer 22 and the light refractive index of the second flat layer 28 is disposed between the wavelength conversion layer 22 and the second flat layer 28, a light refraction index difference between the wavelength conversion layer 22 and the second matching layer 27 and the light refractive index difference between the second matching layer 27 and the second flat layer 28 are respectively smaller than the light refractive index difference between the wavelength conversion layer 22 and the second flat layer 28. Consequently, it is possible to suppress a light loss due to interface reflection that occurs in the wavelength converter 20 and improve the light use efficiency.

With the wavelength converter 20 in this embodiment, since reflection of light between the air and the second flat layer 28 is suppressed by the reflection prevention layer 29, it is possible to improve the light use efficiency.

With the light source device 2 in this embodiment, since the light source device 2 includes the wavelength converter 20 and the semiconductor lasers 10*a* that emit the excitation light B toward the light incident surface 22*a* of the wavelength conversion layer 22, the light use efficiency of the light source device 2 is improved.

With the projector 1 in this embodiment, since the projector 1 includes the light source device 2, the light modulation devices 4R, 4G, and 4B that modulate, according to image information, lights emitted from the light source device 2 to thereby form image lights, and the projection optical device 6 that projects the image lights, the light use efficiency of the projector 1 is improved.

The present disclosure is not limited to the content of the embodiment explained above and can be changed as appropriate without departing from the gist of the disclosure.

For example, specific descriptions of shapes, numbers, dispositions, materials, manufacturing methods, and the like of the components of the wavelength converter 20, the light source device 2, and the projector 1 are not limited to the embodiment explained above and can be changed as appropriate.

In the embodiment explained above, an example is explained in which the light source device 2 is mounted on the projector 1 in which the liquid crystal panel is used. However, not only this, but the light source device 2 may be mounted on, for example, a projector in which a digital micromirror device functioning as a light modulation device is used.

The light source device 2 may include a rotational phosphor wheel that is rotated by a motor.

In the embodiment explained above, an example is explained in which the light source device 2 is mounted on the projector 1. However, not only this, but the light source device 2 can also be applied to lighting equipment, headlights of an automobile, and the like.

SUMMARY OF THE PRESENT DISCLOSURE

A summary of the present disclosure is noted below.

Note 1

A wavelength converter including:

- a wavelength conversion layer including a recess on a surface thereof and configured to convert first light having a first wavelength into second light having a second wavelength different from the first wavelength;
- a first layer provided on a first surface among surfaces of the wavelength conversion layer; and
- a first flat layer provided on a surface on an opposite side of a surface of the first layer facing the wavelength conversion layer, the first flat layer entering the recess of the first surface, wherein a light refractive index of the first layer is an intermediate light refractive index between a light refractive index of the wavelength conversion layer and a light refractive index of the first flat layer.

With the configuration described in Note 1, since the first layer having the intermediate light refractive index between the light refractive index of the wavelength conversion layer and the light refractive index of the first flat layer is disposed between the wavelength conversion layer and the first flat layer, a light refractive index difference between the wavelength conversion layer and the first layer and a light refractive index difference between the first layer and the first flat layer are respectively smaller than a light refractive index difference between the wavelength conversion layer and the first flat layer. Consequently, it is possible to suppress a light loss due to interface reflection that occurs in the wavelength converter and improve light use efficiency.

Note 2

The wavelength converter described in Note 1, further including a reflection layer provided on a surface on an opposite side of a surface of the first flat layer facing the first layer and configured to transmit the first light and reflect the second light emitted from the wavelength conversion layer.

With the configuration of Note 2, since the reflection layer reflects the second light emitted from the first surface side of the wavelength conversion layer, the second light is prevented from being radiated from the first surface side to an outside. Light use efficiency of the second light is improved.

Note 3

The wavelength converter described in Note 1 or Note 2, wherein $$\sqrt{n1 \cdot n2} - 0.1 < n < \sqrt{n1 \cdot n2} + 0.1,$$

where n represents the light refractive index of the first layer, n1 represents the light refractive index of the wavelength conversion layer, and n2 represents the light refractive index of the first flat layer.

With the configuration of Note 3, since the first layer has the light refractive index satisfying the above expression, it is possible to further suppress reflection of light that occurs between the wavelength conversion layer and the first flat layer.

Note 4

The wavelength converter described in any one of Note 1 to Note 3, wherein $n \cdot d = \lambda/4$, where n represents the light refractive index of the first layer, $\lambda$ represents the first wavelength, and d represents a film thickness of the first layer.

With the configuration of Note 4, since the above expression is satisfied, a phase of reflected light that occurs in an interface between the first flat layer and the first layer and a phase of reflected light that occurs in an interface between the first layer and the wavelength conversion layer are opposite. Therefore, the reflected lights cause interference, whereby reflection between the wavelength conversion layer and the first flat layer is further suppressed.

Note 5

The wavelength converter described in Note 2, wherein an average reflectance of the reflection layer for the first light is 4% or lower, and a difference between a maximum reflectance and a minimum reflectance of the reflection layer for the first light is 2% or smaller.

With the configuration of Note 5, since the reflectance for the first light is suppressed to be small and fluctuation in the reflectance of the reflection layer for the first light due to, for example, fluctuation in a film thickness of the first flat layer is suppressed, the light use efficiency is improved.

Note 6

The wavelength converter described in any one of Note 1 to Note 5, wherein the wavelength conversion layer is made of a yttrium-aluminum-garnet (YAG)-based phosphor, the first layer is a single layer made of $Al_2O_3$, and the first flat layer is $SiO_2$.

With the configuration of Note 6, when the wavelength conversion layer is the YAG-based phosphor and the first flat layer is $SiO_2$, since $Al_2O_3$ having the intermediate light refractive index between the light refractive index of the wavelength conversion layer and the light refractive index of the first flat layer is adopted for the first layer, it is possible to realize a wavelength converter having high light use efficiency.

Note 7

The wavelength converter described in any one of Note 1 to Note 6, further including;

a second layer provided on a second surface on an opposite side of the first surface among the surfaces of the wavelength conversion layer; and a second flat layer provided on a surface on an opposite side of a surface of the second layer facing the wavelength conversion layer, the second flat layer entering the recess of the second surface, wherein a light refractive index of the second layer is an intermediate light refractive index between the light refractive index of the wavelength conversion layer and the light refractive index of the second flat layer.

With the configuration of Note 7, since the second layer having the intermediate light refractive index between the light refractive index of the wavelength conversion layer and the light refractive index of the second flat layer is disposed between the wavelength conversion layer and the second flat layer, a light refractive index difference between the wavelength conversion layer and the second layer and a light refractive index difference between the second layer and the second flat layer are respectively smaller than a light refractive index difference between the wavelength conversion layer and the second flat layer. Consequently, it is possible to suppress a light loss due to interface reflection that occurs in the wavelength converter and improve the light use efficiency.

Note 8

The wavelength converter described in Note 7, further including a reflection prevention layer provided on a surface on an opposite side of a surface of the second flat layer facing the second layer and configured to transmit the first light and the second light.

With the configuration of Note 8, since reflection of light between the air and the second flat layer is suppressed by the reflection prevention layer, it is possible to improve the light use efficiency.

Note 9

A light source device including:

the wavelength converter described in any one of Note 1 to Note 8; and a light emitting element configured to emit the first light toward the first surface of the wavelength conversion layer.

With the configuration of Note 9, it is possible to realize a light source device having high light use efficiency.

Note 10

A projector including:

the light source device described in Note 9;

a light modulation device configured to modulate, according to image information, light emitted from the light source device to thereby form image light; and a projection optical device configured to project the image light.

With the configuration of Note 10, it is possible to realize a projector having high light use efficiency.

What is claimed is:

1. A wavelength converter comprising:

a wavelength conversion layer including a first recess on a first surface thereof and configured to convert first light having a first wavelength into second light having a second wavelength different from the first wavelength;

a first layer provided on the first surface of the wavelength conversion layer; and a first flat layer provided on a second surface on an opposite side of a surface of the first layer facing the wavelength conversion layer, the first flat layer entering the first recess of the first surface, wherein a light refractive index of the first layer is an intermediate light refractive index between a light refractive index of the wavelength conversion layer and a light refractive index of the first flat layer, and $\sqrt{n1 \cdot n2}-0.1<n<\sqrt{n1 \cdot n2}+0.1$, n is the light refractive index of the first layer, n1 is the light refractive index of the wavelength conversion layer, and n2 is the light refractive index of the first flat layer.

2. The wavelength converter according to claim 1, further comprising a reflection layer provided on a surface on an opposite side of a surface of the first flat layer facing the first layer and configured to transmit the first light and reflect the second light emitted from the wavelength conversion layer.

3. The wavelength converter according to claim 2, wherein an average reflectance of the reflection layer for the first light is 4% or lower, and a difference between a maximum reflectance and a minimum reflectance of the reflection layer for the first light is 2% or smaller.

4. The wavelength converter according to claim 1, wherein $n \cdot d=\lambda/4$, n is the light refractive index of the first layer, λ is the first wavelength, and d is a film thickness of the first layer.

5. The wavelength converter according to claim 1, wherein the wavelength conversion layer is made of a yttrium-aluminum-garnet (YAG)-based phosphor, the first layer is a single layer made of $Al_2O_3$, and the first flat layer is $SiO_2$.

6. The wavelength converter according to claim 1, further comprising;

a second layer provided on a third surface on an opposite side of the first surface of the wavelength conversion layer, the third surface having a second recess; and a second flat layer provided on a surface on an opposite side of a surface of the second layer facing the wavelength conversion layer, the second flat layer entering the second recess of the third surface, wherein a light refractive index of the second layer is an intermediate light refractive index between the light refractive index of the wavelength conversion layer and the light refractive index of the second flat layer.

7. The wavelength converter according to claim 6, further comprising a reflection prevention layer provided on a surface on an opposite side of a surface of the second flat layer facing the second layer and configured to transmit the first light and the second light.

8. A light source device comprising:

the wavelength converter according to claim 1; and a light emitting element configured to emit the first light toward the first surface of the wavelength conversion layer.

9. A projector comprising:

the light source device according to claim 8;

a light modulation device configured to modulate, according to image information, light emitted from the light source device to thereby form image light; and a projection optical device configured to project the image light.

10. A wavelength converter comprising:

a wavelength conversion layer including a first recess on a first surface thereof and configured to convert first light having a first wavelength into second light having a second wavelength different from the first wavelength;

a first layer provided on the first surface of the wavelength conversion layer;

a first flat layer provided on a second surface on an opposite side of a surface of the first layer facing the wavelength conversion layer, the first flat layer entering the first recess of the first surface; and a reflection layer provided on a surface on an opposite side of a surface of the first flat layer facing the first layer and configured to transmit the first light and reflect the second light emitted from the wavelength conversion layer, wherein a light refractive index of the first layer is an intermediate light refractive index between a light refractive index of the wavelength conversion layer and a light refractive index of the first flat layer, an average reflectance of the reflection layer for the first light is 4% or lower, and a difference between a maximum reflectance and a minimum reflectance of the reflection layer for the first light is 2% or smaller.

* * * * *